United States Patent [19]

Baker et al.

[11] 3,988,175

[45] Oct. 26, 1976

[54] SOLDERING FLUX AND METHOD

[75] Inventors: James C. Baker, Coopersburg; Robert E. Bauer, Allentown, both of Pa.

[73] Assignee: Bethlehem Steel Corporation, Bethlehem, Pa.

[22] Filed: Aug. 23, 1974

[21] Appl. No.: 499,959

[52] U.S. Cl. ................................ 148/26; 75/68 R; 75/94
[51] Int. Cl.² ........................................ B23K 35/34
[58] Field of Search ............................ 148/26; 75/68

[56] References Cited
UNITED STATES PATENTS
2,788,303  4/1957  Ballard ................................ 148/26
3,604,104  9/1971  Glasgow .............................. 148/26

Primary Examiner—Peter D. Rosenberg
Attorney, Agent, or Firm—Joseph J. O'Keefe; William B. Noll

[57] ABSTRACT

A reaction type flux and the method utilizing same in the soldering of aluminum containing products, particularly aluminum-zinc coated ferrous sheet and strip products. Said flux comprising a mixture consisting essentially of, parts by weight, 10 to 14 stannous chloride, 0.25 to 1.5 ammonium chloride, and 0.05 to 0.3 sodium fluoride. Such a flux mixture is characterized by a reaction temperature in the anhydrous condition of less than about 470° F., preferably below about 450° F., thereby permitting the application of electric iron techniques in the soldering operation.

15 Claims, 3 Drawing Figures

SOLDERING FLUX AND METHOD

BACKGROUND OF THE INVENTION

This invention is directed to a new reaction type flux that was developed primarily to provide improved solderability of aluminum-zinc coated ferrous sheet and strip products. While such a flux has a broader range of application, i.e. soldering of aluminum, aluminum alloys, aluminum and aluminum alloy coated ferrous products, the further description will be directed towards its primary application.

For greater insight into the uniqueness of the aluminum-zinc coatings, particularly a coating consisting essentially of 25 to 70%, by weight, aluminum, balance zinc, reference may be made to U.S. Pat. Nos. 3,343,930 and 3,393,089, assigned to the assignee of the present invention. Very briefly, such coatings stand alone as coating protection for ferrous substrates as they combine the tenacity and corrosion resistance of an aluminum coating with the galvanic protection of a zinc coating. The development and emergence of this new aluminum-zinc coating required the development of new practices and materials to realize the full potential of such coatings for commercial products. The present invention is a part of the development program to achieve the potential inherent in these new aluminum-zinc coatings.

Certain restrictions or parameters for the flux were either apparent from the outset or were dictated by commercial considerations:

a. electric iron or low temperature soldering desired to avoid excessive distortion of thin sheets, and melting of aluminum-zinc coating b. good capillary action or flow characteristics into joint c. minimum of surface preparation prior to soldering d. ability of flux to attack, i.e. penetrate or remove oxide layer composed primarily of aluminum oxide e. compatability with solder f. speed of soldering The investigation finally led to the flux as described in this specification and in the claims appended thereto.

During the early stages of the investigation, attempts were made to find a suitable organic flux. Organic fluxes are low temperature fluxes, and the least corrosive type of flux which means that post-cleaning is less of a problem as the flux residues are more easily removed. Further, for some applications, organic fluxes had been used to solder aluminum satisfactorily. Nevertheless, even with modified compositions the results were totally unsatisfactory. Soldering tests showed that wetting of the aluminum-zinc coating and capillary action of the solder into lap joints were nonexistent. The results of these trials indicated that a more corrosive flux was needed.

The failures here led to a consideration of the inorganic corrosive-type fluxes, composed of inorganic salts and acids. Various combinations of salts and acids were attempted but none of the formulations could penetrate or remove the oxide film on the aluminum-zinc coating.

Finally, reaction type fluxes were investigated. They are a special group of inorganic fluxes that were initially developed for aluminum. The primary difference between reaction inorganic fluxes and other inorganic fluxes is that the reaction fluxes consist of anhydrous salts and should not be dissolved in water as are most inorganic fluxes. The reaction does not occur in the presence of water. A commercial flux, typical of this group of fluxes is sold under the name "Alcoa 66A" and has a nominal composition comprising 9 parts by weight zinc chloride and 1 part by weight ammonium chloride.

Such a commercial flux was marginally successful in soldering an aluminum-zinc coated ferrous strip as such commercial flux broke up the oxide layer by reacting zinc chloride from the flux with the aluminum from the coating at a soldering temperature between 720°–800° F. As indicated previously, the results were marginal as the reaction temperature was in excess of 480° F. and therefore too high to allow soldering to be performed with electric soldering irons. By being forced to use higher temperatures there is a high risk of melting the aluminum-zinc coating.

A microscopic examination of a 25% to 70% aluminum, balance zinc coating reveals the presence of a cored aluminum-rich dendritic phase in a zinc-rich interdendritic matrix structure. The solidus temperature of a typical coating containing 55 Al-Zn, as observed in a binary phase diagram of zinc and aluminum, is about 900° F. However, the interdendritic region of the coating may be as low as the 720° F. eutectic temperature. In the event melting of the zinc-rich matrix outside the joint occurs during the soldering the solder will be drawn out of the joint to the molten area causing poor bonding and impaired corrosion resistance. Thus, low reaction temperature fluxes are imperative for aluminum-zinc coated products.

Attempts were made to lower the reaction and soldering temperature of "Alcoa 66A" base composition by the addition of one or more common flux ingredients, such as aluminum chloride, lithium chloride, potassium chloride, sodium chloride, stannous chloride, and sodium fluoride. Many of the flux compositions were selected after examining available phase diagrams between various chlorides for compositions with low liquidus points. Despite such examination and subsequent testing, it became apparent that the reaction or soldering temperatures had not been lowered sufficiently to allow soldering with an electric iron.

The investigation continued with reaction-type fluxes but the further efforts were directed toward the use of stannous chloride as an alternative to zinc chloride. Ultimately a formulation of stannous chloride, ammonium chloride and sodium fluoride was selected, with the final work concentrated on the optimization of the three components. This final work revealed unexpected changes in performance with variations in the formulations. For example, in the *Soldering Manual*, American Welding Society, New York, N.Y. 1959, at page 34, there is taught a formulation comprising, by parts, 8.8 stannous chloride, 1 ammonium chloride, and 0.2 sodium fluoride. As will be demonstrated hereinafter, such formulation was found unacceptable for the desired purposes of this invention. It was discovered that by increasing the stannous chloride relative to the other ingredients, the soldering time was significantly reduced while the reaction temperature was lowered by over 35° F.

SUMMARY OF THE INVENTION

This invention is directed to an improved reaction type flux having a reaction temperature of less than about 470° F. and comprising a mixture of stannous chloride, ammonium chloride, and sodium fluoride. Such a flux is particularly suited to soldering aluminum containing products, especially aluminum-zinc coated ferrous sheet and strip products. With a flux reaction temperature below about 470° F., preferably below about 450° F. a minimum of heat is required to effect the soldering of sheet like products thereby minimizing the risk of a distorted product.

DETAILED DESCRIPTION OF PREFERRED EMBODIMENT

In the practice of this invention a method is provided for preparing and joining sheet like materials, wherein at least one of said materials is an aluminum containing metal or alloy. More specifically the method hereof relates to joining procedures such as soldering for sheet like products in which the joint is prepared with a reaction-type flux consisting essentially of stannous chloride, ammonium chloride and sodium fluoride. When formulated within the proportions to be described hereinafter, the flux will be characterized by a reaction temperature of less than 470° F., preferably less than about 450° F. By the use of such a flux, and a matching solder having a low liquidus temperature, a minimum of heat applied to the joint is needed to effect the joining operation. As a consequence, the likelihood of product distortion and a metallurgical change in the product is minimized.

These advantages in the joining operation were achieved through the use of a reaction flux consisting essentially of, by parts:

| Broad Formulation | | Preferred Formulation |
|---|---|---|
| 10 to 14 | Stannous Chloride | 11 to 13 |
| .25 to 1.5 | Ammonium Chloride | .5 to 1.25 |
| .05 to .3 | Sodium Fluoride | .05 to .25 |

It is contemplated that variations between said broad and preferred formulations may be made within the scope of this invention.

Figure 1A:
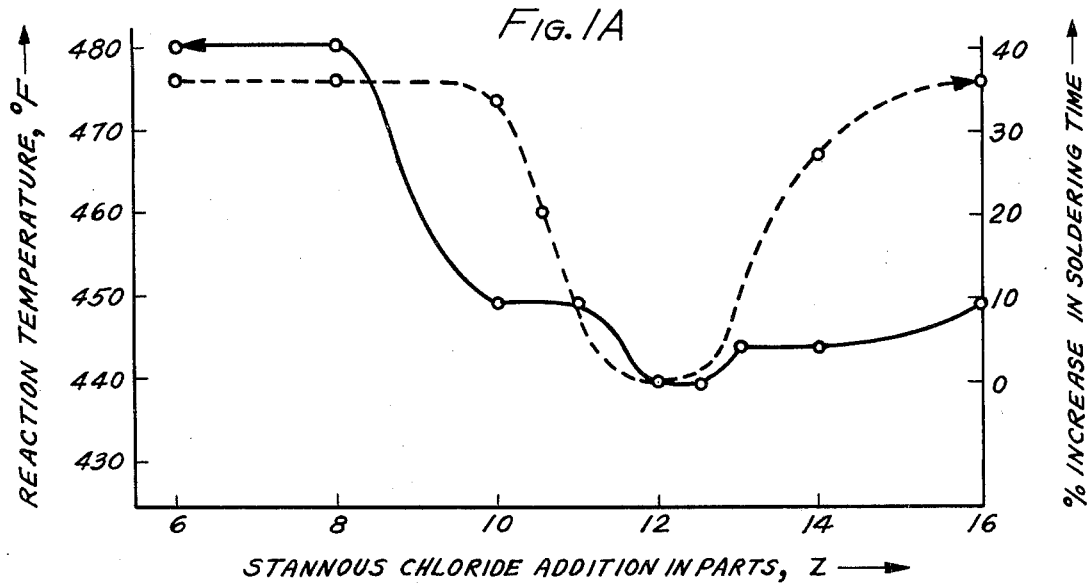
FIGS. 1A to 1C are graphs plotting reaction temperatures and relative soldering speeds for various flux formulations containing stannous chloride, ammonium chloride and sodium fluoride.
Figure 1B:
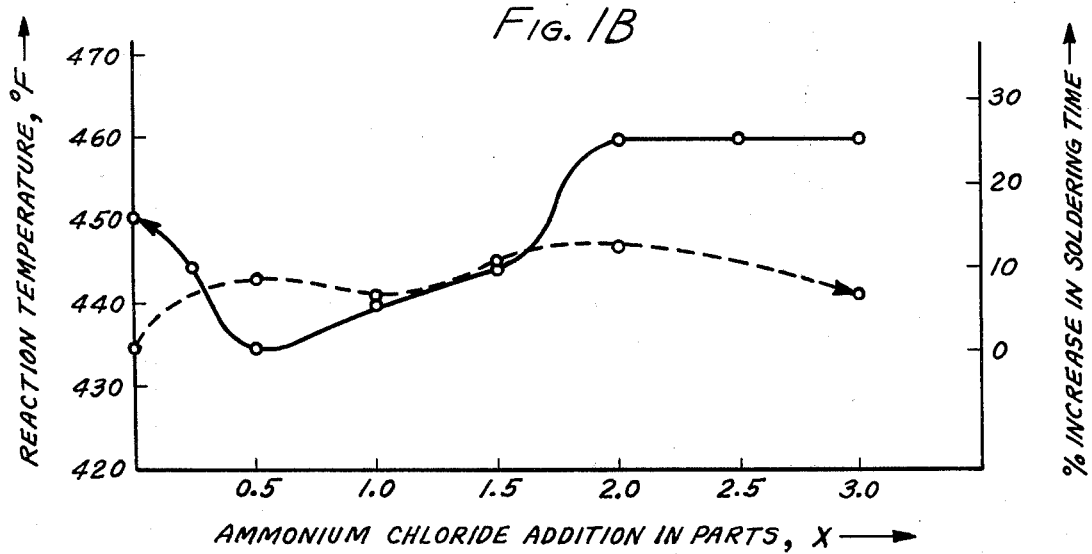
Figure 1C:
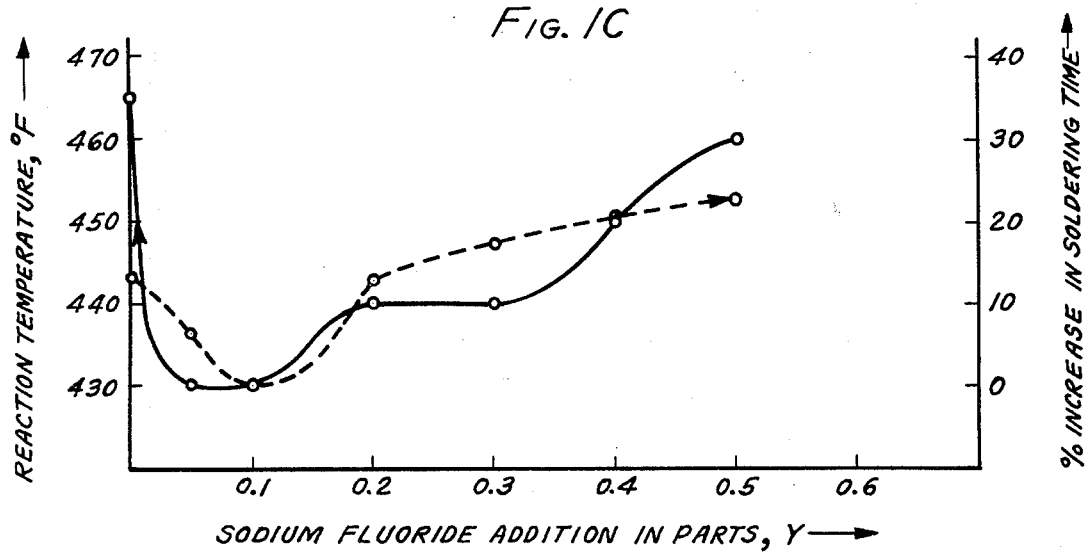

That such limits were not merely an arbitrary selection may be seen from FIGS. 1A to 1C wherein relative soldering speeds and flux reaction temperatures are plotted over a composition change in one of the three ingredients. The basic composition from which each graph was made was one comprising, two of the three following ingredients in the proportions stated while the third was varied, 12 parts stannous chloride, 1 part ammonium chloride, and 1/5 part sodium fluoride. While a relative time or a percent increase in soldering time is plotted on the FIGURES, the actual soldering times are set forth in the TABLE below. The time is a measure of the speed in which the same operator was able to solder a 6 inch joint, ¼ inch overlap, between two sheets of 0.038 inch steel coated with an alloy of 55%, by weight aluminum, balance essentially zinc. The solder for each test was a 70/30 tin-zinc alloy, ⅛ inch diameter wire. The soldering iron was rated at 300 watts. To insure an impartial test, the flux formulation were not revealed to said operator in advance of the test. The reproducibility of results is quite good as the identical composition (12-stannous chloride, 1-ammonium chloride, 1/5-sodium fluoride) was run independently of each other and the time variation was a total of 2.0 seconds. Finally, all fluxes were made into a slurry with n-propyl alcohol for uniform spreading over the joint area.

TABLE

| | Flux Formulation | | | Speed |
|---|---|---|---|---|
| | X | Y | Z | Sec. |
| 1A | 1 | .2 | 6 | 70 |
| | 1 | .2 | 8 | 70 |
| | 1 | .2 | 10 | 69 |
| | 1 | .2 | 12 | 51.5 |
| | 1 | .2 | 14 | 66 |
| | 1 | .2 | 16 | 70 |
| 1B | 0 | .2 | 12 | 48 |
| | .5 | .2 | 12 | 52 |
| | 1 | .2 | 12 | 51 |
| | 1.5 | .2 | 12 | 53 |
| | 2 | .2 | 12 | 54 |
| | 3 | .2 | 12 | 51 |
| 1C | 1 | 0 | 12 | 53 |
| | 1 | .05 | 12 | 50 |
| | 1 | .1 | 12 | 47 |
| | 1 | .2 | 12 | 53 |
| | 1 | .3 | 12 | 55 |
| | 1 | .4 | 12 | 57 |
| | 1 | .5 | 12 | 58 | where:
X = parts, ammonium chloride
Y = parts, sodium fluoride
Z = parts, stannous chloride The suitability of this reaction flux in soldering aluminum-zinc coated ferrous sheet and strip can be attributed in part to the compatibility of flux components, sheet coating alloy and chemical reactions during soldering. During soldering the stannous chloride is a source of free tin which is deposited onto the aluminum-zinc surface by means of the reaction:

$$2Al + 3\ SnCl_2 \rightarrow 3Sn + 2AlCl_3 \uparrow$$

This reaction breaks up the oxide layer and the deposited tin covers the exposed aluminum-zinc surface and allows the molten solder to flow into the joint, wet and alloy with the tin. The ammonium chloride appears to function as a wetting agent while also shielding the exposed aluminum-zinc coating and the deposited tin from oxidation. Finally, the primary function of sodium fluoride appears to be a further improvement in the wetting capabilities.

In practice, the flux may be used in powder form or it may be mixed with an alcohol carrier. Suitable carriers for this flux are n-propyl alcohol and n-butyl alcohol. Such alcohol carriers may be preferred to facilitate coverage or flowability of the flux into the joint to be soldered.

To optimize the soldering or joining procedure a matching or compatible solder should be used. A solder compatible with the selected flux is a solder having a liquidus or melting point that is reached after a normal application of heat or temperature and after the flux has suitably prepared the joint for soldering. A disparity in flux reaction temperature and solder liquidus temperature of about 145° F. was found to be the optimum for ease or speed of soldering. When the temperature difference was reduced to about 120° F. by changing the chemistry of the solder, the solder alloy tended to melt and ball up prior to being accepted into the joint. In other words, the flux had not sufficiently prepared the joint. With an increase in the temperature disparity to about 190° F., soldering speeds became slower. As a consequence, optimum results appear when the difference between the flux reaction temperature and solidus liquidus temperature falls within the range of about 135° to 160° F. In addition, the flux should be one that offers sufficient strength to the joint along with adequate corrosion protection. Finally, since a major object of this invention is to minimize heat input to the product to be soldered, a solder having a relatively low liquidus temperature is desirable.

From this investigation it was concluded that a 70/30, by weight, tin-zinc solder (590° F. liquidus temperature) was ideally matched for use with the reaction flux of this invention. Tensile tests show that the strength of a soldered joint is more than adequate, and the corrosion resistance should be more than satisfactory due to the zinc content.

As a final measure to determine the suitability of the flux of this invention for use in diverse applications and products, the flux was tested on various coated and uncoated ferrous and non-ferrous metals. Success was achieved in each case. This added a further dimension to this invention as it was now possible to solder the aluminum-zinc coated ferrous products to these other coated or uncoated products.

We claim:

1. A reaction flux for use in soldering aluminum and aluminum alloy sheets and strip and metallic coated ferrous sheet and strip selected from the group of metallic coatings consisting of aluminum, alloys of aluminum, and aluminum-zinc, consisting essentially of a mixture, by weight, of 10 to 14 parts stannous chloride, 0.25 to 1.5 parts ammonium chloride, and 0.05 to 0.3 parts sodium fluoride.

2. The flux according to claim 1 wherein the stannous chloride is present in an amount between about 11 to 13 parts.

3. The flux according to claim 2 wherein the ammonium chloride is present in an amount between about 0.5 to 1.25 parts.

4. The flux according to claim 3 wherein the sodium fluoride is present in an amount between about 0.05 to 0.25 parts.

5. The flux according to claim 1 wherein the ammonium chloride is present in an amount between about 0.5 to 1.25 parts.

6. The flux according to claim 1 wherein the sodium fluoride is present in an amount between about 0.05 to 0.25 parts.

7. A flux for soldering aluminum-zinc coated ferrous sheet and strip, consisting essentially of a mixture, by weight, of 10 to 14 parts stannous chloride, 0.25 to 1.5 parts ammonium chloride, and 0.05 to 0.3 parts sodium fluoride.

8. The flux according to claim 7 wherein the aluminum-zinc coating comprises an alloy consisting essentially of, by weight, 25 to 70% aluminum, balance zinc.

9. The flux according to claim 8 wherein the stannous chloride is present in an amount between about 11 to 13 parts.

10. The flux according to claim 9 wherein the ammonium chloride is present in an amount between about 0.5 to 1.25 parts.

11. The flux according to claim 10 wherein the sodium fluoride is present in an amount between about 0.05 to 0.25 parts.

12. The flux according to claim 8 wherein the ammonium chloride is present in an amount between about 0.5 to 1.25 parts.

13. The flux according to claim 8 wherein the sodium fluoride is present in an amount between about 0.05 to 0.25 parts.

14. A reaction flux having a reaction temperature less than about 470° F. consisting essentially of a mixture of anhydrous salts of stannous chloride, ammonium chloride and sodium fluoride.

15. The flux according to claim 14 wherein said reaction temperature is less than about 450° F.

* * * * *